Patented Jan. 3, 1939

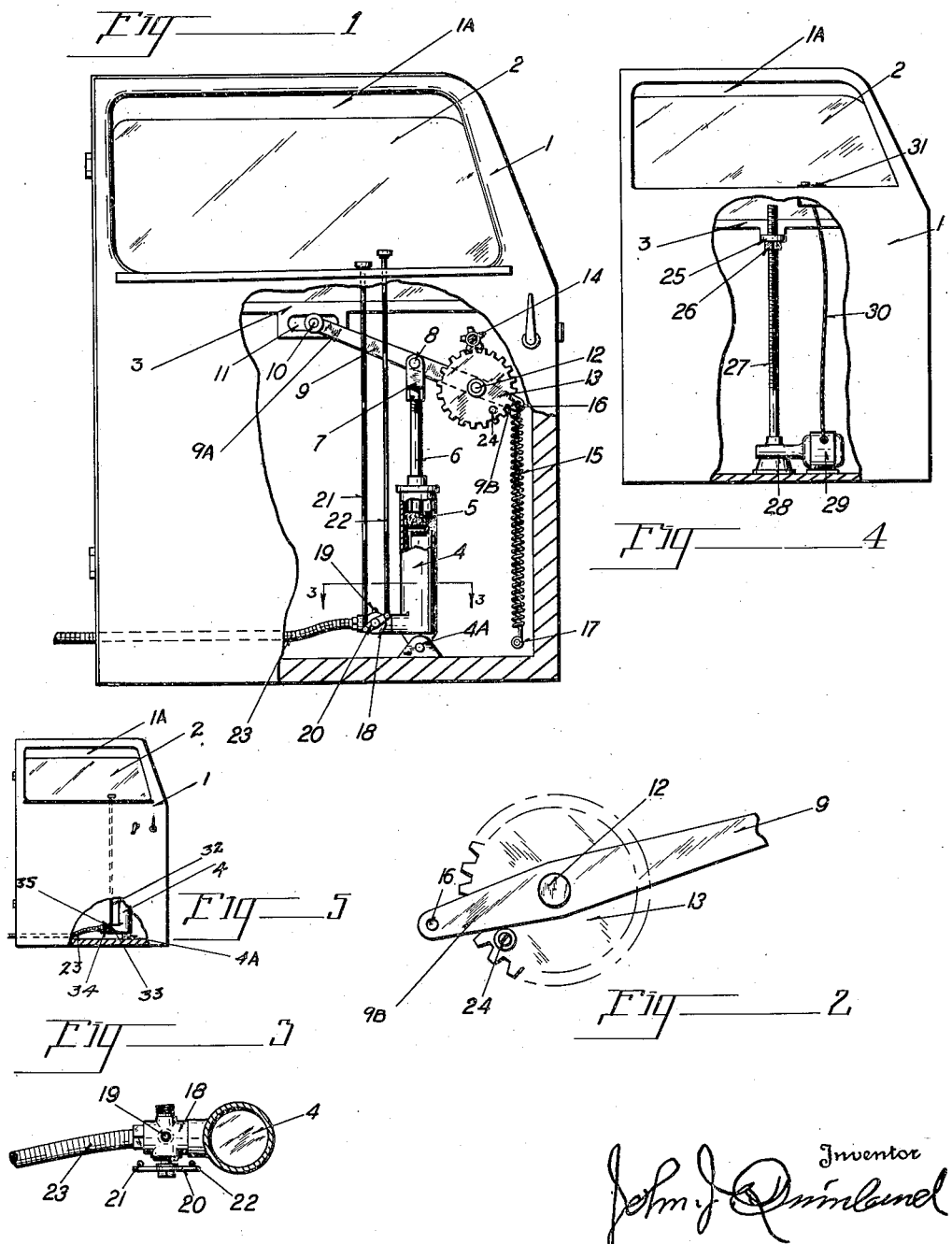

2,142,209

UNITED STATES PATENT OFFICE 2,142,209

WINDOW OPERATING DEVICE FOR VEHICLES

John J. Quinland, La Grande, Oreg.

Application November 14, 1936, Serial No. 110,859
Renewed June 4, 1938

2 Claims. (Cl. 268—125)

My invention relates to power means for raising or lowering the glass windows in enclosed automobiles. The object of the invention is to provide power means, preferably directly or indirectly connected with the automobile propulsion means, for raising or lowering the windows of such vehicles. Specifically, my invention relates to power means as aforesaid which is connected to the glass of such windows which may be caused to raise the glass when it is desired to close the window, or lower it when it is desired to open the window.

An object of the invention is to provide mechanical means for opening and closing windows of automobiles whereby such windows may be speedily opened and closed all or in part, and to further provide simple and easily operated means for controlling such opening or closing.

Another object of the invention is to provide power means for opening and closing windows of the type specified which is simple in construction and positive in operation, and also inexpensive to install, and of such small size that it may be readily incorporated in the door frames of such vehicles.

The means for attaining these objects will be explained in the following description and are shown in the accompanying drawing, wherein:

Figure 1 is a side elevation of a door to an automobile provided with a window and a vertically adjustable glass for opening and closing such window. Parts of the door are broken away to show the mechanism for raising and lowering the glass.

Figure 2 is an elevation of a portion of the operating mechanism, and is designed to show means whereby the glass of the window may be raised or lowered by manual means as well as power means.

Figure 3 is a sectional view of the power cylinder and valve taken on line 3—3 of Figure 1.

Figure 4 is a side elevation of an automobile door with parts broken away in order to show a modified embodiment of the power means for raising and lowering the window glass.

Figure 5 is a side elevation of an automobile door with parts broken away to illustrate the control of the power means through the use of one control rod.

In the drawing, similar characters refer to corresponding parts throughout the several views.

Referring now to the drawing: the numeral 1 indicates an automobile door provided with a window opening 1A which in turn is provided with a glass closure or window 2. Window 2 slides up or down in a well known manner to close or open the opening 1A, and for this purpose is provided with an operating support 3 at and attached to its base.

Mounted upon a shaft 12 in the door frame 5 is an arm 9. One end of this arm has a pin 10 which rides in slot 11 of the support 3. Hence it will be seen from the foregoing, that as the arm is moved up or down upon its pivotal support, it will carry support 3 and glass 2 therewith. Loosely mounted upon shaft 12 is a gear 13 having a stud 24 projecting from one side thereof. Geared to gear 13 is a pinion 14 which connects with a conventional window opening and closing crank mounted upon the rear of door 1, and not shown in the drawing. Rotation of such crank will rotate gear 13 until the stud 24 engages the projecting end portion 9B thus lowering the portion A9 and the window; the closing of the window being accomplished by means of the spring 15 which extends between a connection 17 to the door frame and a connection 16 in the arm portion 9B.

Mounted between the inner and outer walls of the door is a cylinder 4 by means of the pivotal mounting 4A. The cylinder is provided with a piston 5 to which is attached a piston rod 6 extending and operating through the upper end of the cylinder. To the upper end of the piston rod is secured a yoke 7 which is pivotally connected to the arm 9 by means of a pin 8. At the base of the cylinder and connected therewith is a valve 18 of the three way type. Operating the valve is the double lever 20. This valve is also provided with a bleeder 19 and a vacuum connection 23. When the valve is turned to one position by means of the lever 20, the bleeder is closed and a vacuum is created in the cylinder 4 from connection 23, consequently drawing downwardly the piston 5, rod 6, arm 9A and window 2; when turned to another position, it is closed to line 23 and bleeder 19; and when turned to a final position it is closed to line 23, but open to cylinder 4 and bleeder 19 thus allowing air to enter cylinder 4, permitting the piston 5 to be raised in the cylinder by action of the spring 15, allowing the window to be closed. However, stud 24 must be in position against 9B, in opening the window, to allow the arm 9 to be freely pivoted on pin 12. Operating rods 21 and 22 are connected to lever 20 and project through the sill of window 1A to a position convenient for their operation.

A modification of the structure just described is shown in Figure 4. In this instance the window support 3 is provided with a boss 25 to which is attached a nut 26 threaded to the upright rod 27. The lower end of the rod is connected by gearing 28 to electric motor 29 which in turn is connected, by means of connection 30, to operating controls 31. The motor is a reversible motor and by proper manipulation of the controls 31, the rod 27 may be caused to rotate in one direction or the other, thereby raising or lowering window 2.

Referring now to Figure 5, another form of embodiment is shown wherein one operating rod 32 is utilized to control the power means 4. Rod 32 is pivotally connected to lever 33 which in turn is connected to valve 34 which is of the two-way type. Manipulating the rod 32 to one position will close the bleeder 35 and open the vacuum connection 23 to create a vacuum in the power means 4; operating the rod to another position will close the bleeder 35 and vacuum connection 23; setting the rod 32 to a final position will close the vacuum connection 23 and open the bleeder 35, thus allowing air to enter the cylinder 4. The operating of the control rod 32 will close or open the window and it will also keep the window at any determined position.

While a specific form of improvement has been described and illustrated herein, it is desired to be understood that the same may be varied, within the scope of the appended claims, without departing from the spirit of the invention.

Having described my invention, I claim:

1. In a window operating device for vehicle windows, the combination of a vehicle body having a sliding window, a shaft mounted on the body, an arm pivoted loosely thereon and having a sliding pivotal connection with the window, a gear mounted on the shaft and having a projecting stud engaging and moving the arm when the gear is rotated, means for manually rotating the gear, a hydraulic power member for operating the arm independently of the aforesaid means, and a control means controlling the operation of the hydraulic power member.

2. In a window operating device for vehicle windows, the combination of a vehicle body having a sliding window, a shaft mounted on the body, an arm pivotally supported on the shaft and connected at one end to the window, a spring connected to one end of the arm and to a fixture of the door, a pneumatic element including a cylinder, piston and piston rod, the rod being pivotally connected to the arm, the cylinder being opened at will to engine suction to operate the piston in one direction, a valve associated with the cylinder to control the piston by engine suction or the atmosphere, rods connected to the valve to control said valve, the spring operating the arm when the cylinder is open to the atmosphere, a gear mounted on the shaft and having a projection to engage and move the arm when the gear is rotated, and means on the body for manually controlling the gear.

JOHN J. QUINLAND.